(12) United States Patent
Nonet et al.

(10) Patent No.: US 11,845,681 B2
(45) Date of Patent: Dec. 19, 2023

(54) PROCESS AND PLANT FOR TREATING WASTEWATER CONTAINING MICROPOLLUTANTS OF PHARMACEUTICAL ORIGIN

(71) Applicants: Cockerill Maintenance & Ingenierie S.A., Seraing (BE); CENTRE BELGE D'ETUDE ET DE DOCUMENTATION DE L'EAU, en abrege CEBEDEAU asbl, Liege (BE); LIST—Luxembourg Institute of Science and Technology, Esch-sur-Alzette (LU)

(72) Inventors: Stephane Nonet, Bois-de-Villers (BE); Christian Koehler, Saarburg (DE); Alain Magis, Oupeye (BE)

(73) Assignees: COCKERILL MAINTENANCE & INGENIERIE S.A., Seraing (BE); CENTRE BELGE D'ETUDE ET DE DOCUMENTATION DE L'EAU, EN ABREGE CEBEDEAU ASBL, Liege (BE); LIST—LUXEMBOURG INSTITUTE OF SCIENCE AND TECHNOLOGY, Esch-sur-Alzette (LU)

( * ) Notice: Subject to any disclaimer, the term of this patent is extended or adjusted under 35 U.S.C. 154(b) by 367 days.

(21) Appl. No.: 16/972,011

(22) PCT Filed: Jun. 6, 2019

(86) PCT No.: PCT/EP2019/064854
§ 371 (c)(1),
(2) Date: Sep. 29, 2021

(87) PCT Pub. No.: WO2019/234182
PCT Pub. Date: Dec. 12, 2019

(65) Prior Publication Data
US 2022/0411298 A1     Dec. 29, 2022

(30) Foreign Application Priority Data

Jun. 8, 2018   (EP) .................................. 18176828

(51) Int. Cl.
*C02F 3/12*      (2023.01)
*C02F 3/08*      (2023.01)
(Continued)

(52) U.S. Cl.
CPC ............ *C02F 3/1268* (2013.01); *C02F 3/085* (2013.01); *C02F 2003/003* (2013.01);
(Continued)

(58) Field of Classification Search
CPC .. C02F 3/1268; C02F 3/085; C02F 2003/003; C02F 2103/343; C02F 2203/002;
(Continued)

(56) References Cited

U.S. PATENT DOCUMENTS

2013/0153493 A1*   6/2013  Young .................. C02F 3/1268
                                                      210/615

FOREIGN PATENT DOCUMENTS

CN     107098463 A     8/2017
EP     2960214 A1     12/2015
(Continued)

OTHER PUBLICATIONS

Translation of Yamazaki (JP 4870708) (Year: 2012).*
(Continued)

*Primary Examiner* — Ekandra S. Miller-Cruz
(74) *Attorney, Agent, or Firm* — LEYDIG, VOIT & MAYER, LTD.

(57) ABSTRACT

A completely biological method for removing a first group of micropollutants of pharmaceutical origin and a second group of micropollutants of pharmaceutical origin from raw wastewater includes: providing a first buffer tank upstream
(Continued)

of a bioreactor; providing a moving bed membrane bioreactor (MB-MBR) for developing biomass growth both on a fixed support and in suspension in a form of flocs, and on mobile supports, the bioreactor obtaining an effluent with a COD concentration of organic matter of less than 50 mg $l^{-1}$ and a total nitrogen concentration of less than 15 mg $l^{-1}$; providing a biofiltration tank, separate from the first buffer tank of the bioreactor, that includes one or more biologically activated carbon (BAC) columns containing activated carbon; supplying the first buffer tank upstream of the bioreactor with raw wastewater containing micropollutants of pharmaceutical origin; pretreating the wastewater by passing the wastewater through a fine mesh sieve.

12 Claims, 15 Drawing Sheets

(51) Int. Cl.
*C02F 3/00* (2023.01)
*C02F 103/34* (2006.01)

(52) U.S. Cl.
CPC .. *C02F 2103/343* (2013.01); *C02F 2203/002* (2013.01); *C02F 2303/02* (2013.01)

(58) Field of Classification Search
CPC ...... C02F 2303/02; C02F 1/001; C02F 1/444; Y02W 10/10
USPC ......................................................... 210/615
See application file for complete search history.

(56) References Cited

FOREIGN PATENT DOCUMENTS

| JP | 4870708 B2 | 2/2012 | |
|---|---|---|---|
| WO | WO 2012019294 A1 | 2/2012 | |
| WO | WO 2012119266 A1 | 9/2012 | |
| WO | WO-2012160526 A2 * | 11/2012 | ................ C02F 3/34 |
| WO | WO 2014036732 A1 | 3/2014 | |
| WO | WO 2017067882 A1 | 4/2017 | |

OTHER PUBLICATIONS

Sofia Andersson, "Characterization of Bacterial Biofilms for Wastewater Treatment", School of Biotechnology, Royal Institute of Technology (KTH), Stockholm, Sweden, Dec. 2009, pp. 2-63.
Michael Aubenneau, et al., "Membrane bioreactor for pharmaceutically active compounds removal: Effects of carbamazepine on mixed microbial communities implied in the treatment", Process Biochemistry, vol. 45, Elsevier, Amsterdam, Netherlands, Apr. 13, 2010, pp. 1826-1831.
Sheng Chang, et al., "Adsorption of the Endocrine-Active Compound Estrone on Microfiltration Hollow Fiber Membranes", Environ. Sci. Technol., vol. 37, No. 14, Centre for Water and Waste Technology, Department of Civil and Environmental Engineering, and UNESCO Center for Membrane Science and Technology, Department of Chemical Engineering and Industrial Chemistry, The University of New South Wales, Sydney, New South Wales 2052, Australia, Dec. 2003, pp. 3158-3163.
Libing Chu, et al., "Comparison of polyurethane foam and biodegradable polymer as carriers in moving bed biofilm reactor for treating wastewater with a low C/N ratio", Chemosphere, vol. 83, Elsevier, Amsterdam, Netherlands, Jan. 26, 2011, pp. 63-68.
N. Cicek, et al., "Effect of solids retention time on the performance and biological characteristics of a membrane bioreactor", Water Science and Technology, vol. 43, No. 11, IWA Publishing, London, United Kingdom, Dec. 2011, pp. 43-50.
M. Clara, et al., "Removal of selected pharmaceuticals, fragrances and endocrine disrupting compounds in a membrane bioreactor and conventional wastewater treatment plants," Water Research, vol. 39, Elsevier, Amsterdam, Netherlands, Oct. 19, 2005, pp. 4797-4807.
T. De La Torre, et al., "Trace organics removal using three membrane bioreactor configuration: MBR, IFAS-MBR and MBMBR", Water Science & Technology, vol. 71.5, IWA Publishing, Jan. 23, 2015, pp. 761-768.
Heleen De Wever, et al., "Comparison of sulfonated and other micropollutants removal in membrane bioreactor and conventional wastewater treatment", Water Research, vol. 41, Elsevier, Amsterdam, Netherlands, Dec. 2007, pp. 935-945.
P. Falas, et al., "Suspended biofilm carrier and activated sludge removal of acidic pharmaceuticals", Water Research, vol. 46, Elsevier, Amsterdam, Netherlands, Dec. 2012, pp. 1167-1175.
P. Falas, et al., "Micropollutant removal by attached and suspended growth in a hybrid biofilm-activated sludge process", Water Research, vol. 47, Elsevier, Amsterdam, Netherlands, Dec. 2013, pp. 4498-4506.
Adriano Joss, et al., "Biological degradation of pharmaceuticals in municipal wastewater treatment: Proposing a classification scheme", Water Research, vol. 40, Elsevier, Amsterdam, Netherlands, Feb. 15, 2006, pp. 1686-1696.
Yunlong Luo, et al., "Removal and fate of micropollutants in a sponge-based moving bed bioreactor", Bioresource Technology, vol. 159, Elsevier, Amsterdam, Netherlands, Mar. 5, 2014, pp. 311-319.
Huu-Hao Ngo, et al., "Evaluation of a novel sponge-submerged membrane bioreactor (SSMBR) for sustainable water reclamation", Bioresource Technology, vol. 99, Elsevier, Amsterdam, Netherlands, Jun. 26, 2007, pp. 2429-2435.
Luong N. Nguyen, et al., "Removal of trace organic contaminants by a membrane bioreactor-granular activated carbon (MBR-GAC) system", Bioresource Technology, vol. 113, Elsevier, Amsterdam, Netherlands, Oct. 20, 2011, pp. 169-173.
Jelena Radjenovic, et al., "Analysis of pharmaceuticals in wastewater and removal using a membrane bioreactor", Anal Bioanal Chem, vol. 387, Springer-Verlag, Berlin, Germany, Nov. 18, 2006, pp. 1365-1377.
L. Rodriguez-Hernandez, et al., Comparison between a fixed bed hybrid membrane bioreactor and a conventional membrane bioreactor for municipal wastewater treatment: a pilot-scale study, Bioresource Technology, vol. 152, Elsevier, Amsterdam, Netherlands, Nov. 4, 2013, pp. 212-219.
Hyungkeun Roh, et al., "Biodegradation potential of wastewater micropollutants by ammonia-oxidizing bacteria", Chemosphere, vol. 77, Elsevier, Amsterdam, Netherlands, Sep. 20, 2009, pp. 1084-1089.
E. E. Schneider, et al., ,,MBBR evaluation for oil refinery wastewater treatment, with post-ozonation and BAC, for wastewater reuse, Water Science & Technology, vol. 63.1, IWA Publishing, London, United Kingdom, Dec. 2011, pp. 143-148.
Niina Vieno, et al., "Fate of diclofenac in municipal wastewater treatment plant—A review", Environmental International, vol. 69, Elsevier, Amsterdam, Netherlands, Dec. 2014, pp. 28-39.
Stefan Weiss, et al., "Membrane bioreactors for municipal wastewater treatment—a viable option to reduce the amount of polar pollutants discharged into surface waters?", Water Research, vol. 42, Elsevier, Amsterdam ,Netherlands, Jun. 24, 2008, pp. 3837-3847.
Mojca Zupanc, et al., "Removal of pharmaceuticals from wastewater by biological processes, hydrodynamic cavitation and UV treatment", Ultrasonics Sonochemistry, vol. 20, Elsevier, Amsterdam, Netherlands, Dec. 28, 2012, pp. 1104-1112.
Yunlong Luo, et al., "A review on the occurrence of micropollutants in the aquatic environment and their fate and removal during wastewater treatment," Science of Total Environment 473-474, Elsevier, Amsterdam, Netherlands, Jan. 4, 2014, XP028826903, pp. 619-641.
Yunlong Luo, et al., "Evaluation of micropollutant removal and fouling reduction in a hybrid moving bed biofilm reactor-membrane

(56) References Cited

OTHER PUBLICATIONS bioreactor system", Bioresource Technology, vol. 191, Elsevier, Amsterdam, Netherlands, May 25, 2015, XP029235160, pp. 355-359.

L. Paredes, et al., "Understanding the fate of organic micropollutants in sand and granular activated carbon biofiltration systems", Science of Total Environments 551-2, Elsevier, Amsterdam, Netherlands, Feb. 18, 2016, XP029472175, pp. 640-648.

L. Paredes, et al., "Supplementary information Understanding the fate of organic micropollutants in sand and granular activated carbon biofiltration systems", Feb. 18, 2016, Retrieved from Internet: https://ars-els-cdn.com/content/image/1-s2.0-S0048969716302194-mmc1.docx [retrieved on Jul. 17, 2019], XP055606469, pp. 1-10.

Qi Jiang, et al., "Effect of hydraulic retention time on the performance of a hybrid moving bed biofilm reactor-membrane bioreactor system for micropollutants removal from municipal wastewater", Bioresource Technology, vol. 247, Elsevier, Amsterdam, Netherlands, Sep. 20, 2017, XP085298926, pp. 1226-1232.

* cited by examiner

PROCESS AND PLANT FOR TREATING WASTEWATER CONTAINING MICROPOLLUTANTS OF PHARMACEUTICAL ORIGIN

CROSS-REFERENCE TO PRIOR APPLICATIONS

This application is a U.S. National Phase application under 35 U.S.C. § 371 of International Application No. PCT/EP2019/064854, filed on Jun. 6, 2019, and claims benefit to European Patent Application No. EP 18176828.4, filed on Jun. 8, 2018. The International Application was published in French on Dec. 12, 2019 as WO 2019/234182 under PCT Article 21(2).

FIELD

The present invention relates to a method for the biological treatment of wastewater containing micropollutants of pharmaceutical origin, even with different physicochemical properties, such as, for example, wastewater discharged by a hospital.

The invention also relates to a plant for implementing the method.

BACKGROUND

The discharge of pharmaceutical products in wastewater is a recent environmental problem. Currently, negative effects attributable to this discharge are already observed on animal species. We may therefore assume that humans could also be affected in the near future. Despite this, no discharge standard has been established to date.

Membrane bioreactors (MBRs) and activated carbon (AC) adsorption methods are two technologies which have been widely studied in the context of wastewater treatment. However, their implementation is relatively new: there are still few full-scale applications for wastewater treatment. Most urban wastewater treatment applications are implemented using conventional activated sludge (CAS) coupled to a settling tank.

Although membrane technology (MBR) is a compact solution which makes it possible to reduce the variability in the removal of macropollutants, or even to reduce the concentration of micropollutants in the treated water (by comparison with a CAS coupled with a sand filter), it still consumes more energy and has higher operating costs than a CAS. This is the reason why MBR technology has not been the preferred solution in the past. In recent years, however, the development of new membranes has made it possible to improve the reliability of the system and reduce power consumption, so that MBR technology is increasingly adopted.

As regards the activated carbon (AC) methods, they are generally not applied in the treatment of wastewater. However, there have recently been some pilot tests in Europe based on the coupling of an MBR to an AC. These are research facilities, not full size units.

More specifically, activated carbon (AC) is a product created from bituminous carbon, lignite, peat, wood or other materials; it may also be synthetic. It may be used in many applications generally involving the adsorption of organic molecules (adsorption of dyes, purification of aqueous solution used in electrodeposition, air purification, medical treatment, etc.). After saturation of its adsorption capacity, the activated carbon may be regenerated and recycled via a method of drying, desorption/decomposition and steam reactivation. This is an expensive method involving the transport of coal and a high energy consumption.

Biofiltration is used in some water sanitation units for the removal of pesticides in particular, but this method is not widely used.

In recent years, various studies indicate that granular activated carbon, in addition to its adsorption capacities, may be used as a support for the growth of bacterial populations. It seems that this form of carbon gives some protection to bacteria. Moreover, the concentration of bacteria on granular activated carbon is often 100 to 1000 times higher than that found on sand filters for the following reasons:

adequate environment;
good adsorption capacity (substrates, nutrients, oxygen);
long contact time between biomass and organic compounds;
reduction in the bioavailability of specific toxic compounds;
presence of functional groups favoring colonization and binding of bacteria.

However, the use of biologically-activated carbon (BAC) columns remains a poorly understood technology. Indeed, many points need to be explored such as:

optimizing the removal of organic substances by the BACs;
improving the removal of micropollutants;
discovering the mechanism(s) for removing micropollutants;
minimizing the colonization time of coal;
studying the impact of backwashing;
determining if column inoculation is effective;
optimizing the parameters favorable to the maintenance of biomass.

Based on current knowledge, the depolluting activity of activated carbon involves three phases: a first period corresponding to simple adsorption, a second period corresponding to adsorption and biodegradation and a third period corresponding to biodegradation. Better control of BAC technology, allowing its commercial development, would therefore constitute a scientific and technical innovation.

The membrane bioreactor (MBR) for its part is a technology allowing biological degradation of pollutants via the use of activated sludge. The membrane makes it possible to maintain a high concentration of suspended matter (the fraction of bacteria in the form of flocs) in the reactor while making it possible to obtain a clarified effluent.

A recent development in membrane reactor technology is the "Moving Bed Membrane Bioreactor (MB-MBR)" with the introduction of a moving or fluidized bed. This type of hybrid reactor, which combines membrane filtration technology and the presence of hybrid biomass, both in the form of suspended flocs and of biofilms attached to a support, is promising for the purification of contaminated water, but practically unexplored for the treatment of pharmaceutical products (PPs)—cf. prior art.

Compared to membrane biofilm reactors (MF-MBRs), hybrid MB-MBRs (or IFAS-MBRs) have, among other things, the advantage of accepting greater loads of suspended matter (see § [0042]).

An efficient combination of the technologies detailed above could lead to:

an improvement in the removal of COD (Chemical Oxygen Demand), including PPs;
a reduction in the clogging of the BACs thanks to the presence of the MBR;

a markedly increased lifespan of the BACs;

the establishment of an effective physical barrier limiting the dissemination of bacteria multi-resistant to antibiotics which are potentially found in hospital effluents;

the introduction of three types of biomass and therefore an increased microbial diversity which makes it possible to reduce a greater number of molecules:

in the form of flocs in the MB-MBR in the form of biofilms developed on supports in the same compartment;

in the form of biofilms developed on the BAC.

Current methods for the purification of pharmaceutical products (PPs) in wastewater include adsorption on suspended particles, volatilization in air, photolysis and biological transformation.

More recently, advanced treatments have also been developed: ozonation, advanced oxidation methods (AOP) such as $O_3/H_2O_2$, $UV/H_2O_2$ or $Fe^{2+}/H_2O_2$ treatment allowing the formation of hydroxyl radicals, membrane filtration methods (nanofiltration and reverse osmosis) and filtration on activated carbon (AC).

Although these methods have been described and investigated at the laboratory scale for the treatment of PPs, there are only a few specific industrial applications for decentralized treatment (i.e. outside urban WWTP) of water rich in PPs. The advantages of the Moving Bed Membrane Bioreactor (MB-MBR) as well as the activated carbon methods compared to other technologies available in the prior art are given below. The references cited are listed in the bibliography.

Membrane Bioreactor

The membrane bioreactor (MBR) is a technology which combines membrane separation and biological degradation by activated sludges.

It is widely used in the treatment of urban and industrial wastewater. The use of this type of reactor for the treatment of wastewater laden with PPs provides three major conceptual advantages compared to conventional activated sludge methods (CAS): the ability to work with a high sludge age (>25 days), a higher concentration of biomass in the reactor as well as complete retention of solid particles. These advantages have a direct impact on the purification of PPs: the membrane retains the solid particles on which the PPs are adsorbed (Clara et al., 2005), some of the PPs are directly adsorbed on the membrane (Chang et al., 2003), while the high sludge age facilitates the biological transformation of PPs within the reactor.

The age of the sludges is a key parameter in the biological transformation methods. It is directly related to the biochemical adaptability of activated sludge. Thus, the high sludge age of MBRs favors the diversification of microbial communities with various physiological characteristics, the adaptation of these communities to the degradation of micropollutants present in the reactor, and the development of bacteria with low growth rates (Aubenneau et al., 2011). Among these bacteria with a low growth rate, nitrifying bacteria seem to play an important role in the degradation of micropollutants. Indeed, Roh et al. (2009) observed a higher biodegradation for certain micropollutants when the biomass is rich in nitrifying bacteria.

The high concentration of biomass decreases the substrate/microorganism ratio within the MBR, resulting in high mineralization of the substrate. This high concentration of activated sludge induces an increase in the exchange of genetic information within the MBRs, thus amplifying the biodiversity in the reactor (Ciçek et al., 2001).

Mass transfers are greater in MBRs than in CAS. Indeed, the bacterial flocs of MBRs are, on average, smaller than those of CAS, and the specific surface of these flocs per unit of reactor volume is greater, thus promoting the biological degradation of pollutants. According to Radjenovic et al. (2007), this mass transfer phenomenon is at the origin of the better purification performance of PPs observed in an MBR compared to a CAS. These authors also observed a better uniformity of the concentrations of diclofenac, ketoprofen, ranitidine, gemfibrozile, bezafibrate, paravastatin and ofloxacin at the exit of the MBR compared to the CAS.

By processing the existing data on the CAS/MBR comparison for the treatment of micropollutants, Weiss and Reemtsma (2008) concluded that the MBR has a purification capacity greater than the CAS for pollutants with an average biodegradability potential. For easily biodegradable substances, these authors put MBR and CAS on the same footing. Although MBR does not always perform better than CAS, De Wever et al. (2007) prefer it for its more constant performance, and its better management of effluents at fluctuating concentrations.

These various advantages make membrane reactors a more suitable technology than CAS for the treatment of pharmaceutical products.

Finally, it should be noted that, for an industrial application, an important advantage of MBRs is the compactness of the system, generated by the high concentration of biomass in the reactor. This compactness is nevertheless influenced by the age of the sludge within the MBR. Indeed, an excessively high sludge age may lead to a decrease in the proportion of active biomass in the MBR.

To overcome this effect, and allow the system to remain compact while being efficient, we may decouple the age of the sludges within the reactor by promoting the development of two bacterial niches within the MBR: one comprising the suspended biomass, with a low sludge age and the other comprising a biomass fixed on supports, with a high sludge age. The advantage of the presence of this type of biofilm method is described in the following section.

Biofilm Method

Activated sludge methods are predominant in the water purification sector. One way of intensifying these methods is to use the natural propensity of bacteria to form biofilms when they are in the presence of suitable supports. Biofilm systems offer several operational advantages over activated sludge systems: low spatial footprint, possibility of operation with low hydraulic retention time, operational flexibility, high concentration of biomass per unit volume of the reactor and low microbial growth, resulting in low sludge production (Andersson, 2009). This type of system is generally classified according to the type of support used: fixed or fluidized.

Although biofilm reactors have been used successfully for the purification of traditional pollutants (organic pollution and nutrients, Chu and Wang, 2011; Ngo et al., 2008), examples of application of such reactors for the purification of micropollutants are much rarer.

Some studies have shown that biofilms could generate better purification efficiencies than methods involving biomass in suspension, for certain micropollutants (Rodriguez-Hernandez et al, 2014; Zupanc et al, 2013; Falas et al, 2012; 2013). While these studies do not describe the underlying mechanisms for explaining these differences, it is likely that the increase in microbial diversity in the reactor is an important cause. This richness, favored by the decoupling of the age of the sludges in suspension compared to that of the fixed biomass, makes it possible to obtain a better adaptation of the bacterial community to the substrate and to promote the development of slow-growing microorganisms within the reactor.

The observations made by Falas et al. (2013) for the degradation of specific PPs between a fixed and suspended biomass reactor are summarized in Table 1

TABLE 1

Degradation constants ($K_{bio}$) of certain micropollutants for suspended and fixed biomass

| Pharmaceutical products | | $K_{bio}$ (l/g biomass · day) Biomass | |
|---|---|---|---|
| | | suspended | Fixed |
| Antibiotics | N-acetylsulfamethoxazole | 1.1-1.4 | 0.7-1.6 |
| | Clarithromycin | 0.18-0.29 | ≤0.2 |
| Anti-inflammatories | Diclofenac | ≤0.1 | 1.3-1.7 |
| Antiepileptics | Carbamazepine | ≤0.1 | ≤0.1 |
| Beta blockers | Atenolol | 0.67-0.9 | 0.53-0.67 |
| Hypolipidemic agents | Bezafibrate | 2.3-2.9 | 5.2-6.0 |

In this table, the degradation constants include the mechanisms of sorption, desorption and biodegradation, and are given as the degradation constant Kbio. Depending on the Kbio, three groups of compounds may be identified: not significantly degraded (<20%) for compounds with Kbio<0.1 l/(g biomass·day), compounds degraded to more than 90% for compounds with Kbio>10 l/(g biomass·day) and more or less degraded compounds for intermediate values (Joss et al., 2006). The biofilm method has been observed to promote the degradation of thrimethroprime, ketoprofen, diclofenac, levetiracetam, valsartan and benzofibrate over the suspended biomass method. These better efficiencies could be explained by the different oxidation-reduction conditions existing within the biofilms (oxic/anoxic). A careful adjustment of the thickness of the biofilms acts on the redox gradient within it, and therefore on the microorganisms therein.

The study by Luo et al. (2014) deals with the use of a biofilm reactor with a sponge bacterial support, with reported reduction rates varying between 25.9 and 96.8%, depending on the micropollutants considered. In this study, biodegradation was identified as the main mechanism for degradation of micropollutants. Adsorption on sludge also plays a significant role, especially for carbamazepine, ketoprofen and pentachlorophenol.

Biofilm methods therefore, a priori, fully find their justification in the treatment of micropollutants.

Moving Bed Membrane Bioreactor (MB-MBR)

The "Moving Bed Membrane Bioreactor (MB-MBR)" is a recent development in membrane reactor technology. This type of reactor, which combines the advantages of biofilms and that of membrane filtration (see above), is promising for the in situ purification of water laden with PPs because it brings together the advantages of both technologies in one single method. Current research mainly focuses on the impact of the moving bed on the reduction of membrane clogging.

Industrial applications of MB-MBR type reactors have, to the knowledge of the inventors, not yet been used for the treatment of wastewater concentrated with PPs, although the potential of this technology for the removal of pharmaceutical compounds is important.

The advantage of MB-MBR is that it is a very compact technology, but its disadvantage is a high investment cost.

N. Vieno et al. studied the removal of diclofenac in a municipal wastewater treatment plant. Membrane bioreactors (MBRs) and mixed bioreactors (MB-MBR) provide better removal of diclofenac compared to conventional activated sludge.

T. de la Torre et al. studied the removal of 17 pharmaceutical compounds and 22 trace organic pollutants in a pilot urban wastewater treatment plant. Bioreactors with suspended biomass (MBRs) or mixed membranes (MB-MBRs), as well as a membrane bioreactor with integrated biofilm (IFAS-MBR) were compared. Reverse osmosis was also used after the pilot plant to improve removal rates.

Hormone removal amounted to 100% in the IFAS-MBR reactor, which was attributed to the presence of biofilm. After reverse osmosis, removal rates of 88% on average are achieved.

MBR Coupling—Activated Carbon

Although MBR is considered to be an effective method for the treatment of specific PPs, it unfortunately does not allow all of the micropollutants present in wastewater to be degraded/adsorbed. The limited effectiveness of MBRs for the degradation of certain micropollutants requires the coupling of the aerobic method with a post-treatment, such as, for example, an activated carbon (AC). Such a coupling is theoretically interesting.

Indeed, the effluent at the outlet of the MBR is already partially purified, and it contains much less voluminous organic compounds which could compete with the PPs for the adsorption sites of the activated carbon.

The studies by Nguyen et al. (2012, 2013) deal with the joint use of an MBR coupled with a granular activated carbon unit in post-treatment for the degradation of PPs. The problem of regeneration of activated carbon other than by replacement is not resolved (replacement of the entire AC is necessary every 1000 BV to maintain a purification rate of fenoprop, a herbicide, above 20%).

E. Schneider et al. evaluated the performance of an MB-MBR reactor for the treatment of petroleum refinery wastewater and the possibility of reusing the MB-MBR effluents, after ozonation, in series with a BAC column.

Document EP 2960214 relates to a method for the removal of pharmaceutical products present in wastewater by using powdered activated carbon (PAC) in a sequential biological reactor coupled to a chamber with a filtration membrane. This reactor comprises a first reaction unit which operates sequentially and in which the PAC is added. The effluent produced from the first unit passes to a contiguous chamber which has an ultrafiltration membrane with a pore size between 0.04 and 0.4 µm, with continuous aeration, and the permeate of which constitutes the method effluent. PAC is added in order to maximize the removal of pharmaceutical pollutants, especially those that are refractory to biological treatments. This method not only reduces organic matter (>95%) and nutrients (>75%), but it also achieves high efficiencies (>90%) of removal of pharmaceuticals present at trace level (<100 µg/L).

In documents WO 2012/119266 and WO 2014/036732, the refractory chemical oxygen demand (COD) is reduced in a water treatment system. The method includes the pretreatment of the liquid in a pretreatment unit to reduce the amount of bacteria or native microorganisms so as to prevent them from harming selected microorganisms introduced from outside. The liquid is then introduced into a reactor which comprises a filter bed made of a support material. Special microorganisms are selected and used to colonize the support material in order to remove the refractory COD. A biofilm is grown on the surface of the support material in order to immobilize the selected microorganisms in the reactor. The method further comprises percolating liquid from the pre-treatment unit through the filter bed colonized by the selected microbes in order to at least partially degrade the refractory COD under aerobic conditions. In one embodiment, the support material is formed of granular activated carbon (GAC) and the selected microorganisms contain at least one microbial species selected from among the following genera: *Bacillus, Comamonas, Arthrobacter, Micrococcus, Pseudomonas, Pediococcus, Achromobacter, Flavobacterium, Mycobacterium, Rhodanobacter, Stenotrophomonas* as well as from among yeasts.

Document WO 2017/067882 discloses a device designed for the treatment of wastewater comprising at least one kind of micropollutants. Said device comprises a column and a backwash system in fluid communication with said column. The column has a zone which includes biologically activated carbon which is downstream of the inlet of the column, said zone being divided into subzones A, B and C. The column further comprises a backwash space, which is located downstream of said zone comprising biologically activated carbon.

Said device is remarkable in that the biologically activated carbon of subzone A comprises starving microorganisms, the biologically activated carbon of subzone B comprises microorganisms fed by a first feeding system, while the biologically activated carbon of subzone C comprises microorganisms fed by a second feed system.

The analysis of the prior art shows that there are a few unexplored approaches which would make it possible to improve the biological treatment of water laden with PPs. Some of these approaches are, for example, that:
- normally, the efficiency of degradation is increased for high sludge ages (greater than 25 days);
- MBR technology is more efficient than conventional activated sludge treatment (CAS);
- methods with fixed biomass may prove to be more efficient than those with suspended biomass;
- bacteria with a low growth rate, including nitrifying bacteria, play a key role in the biodegradation of PPs.

Based on these approaches, it is probable that the degradation of the PPs will be improved by:
a. increasing the age of the sludges in the MBR;
b. the presence of an environment which contains much less easily biodegradable COD, which environment will give a competitive advantage to specialized bacteria;
c. the presence of an environment where specialized bacteria can develop (bacterial supports).

Specialized bacteria are defined as bacteria carefully selected, cultivated and multiplied to obtain and optimize colonization of activated carbon, removal of adsorbed micropollutants and regeneration of activated carbon.

SUMMARY

In an embodiment, the present invention provides a completely biological method for removing a first group of micropollutants of pharmaceutical origin and a second group of micropollutants of pharmaceutical origin from raw wastewater, the method comprising: providing a first buffer tank upstream of a bioreactor; providing a moving bed membrane bioreactor (MB-MBR) for developing biomass growth both on a fixed support and in suspension in a form of flocs, and on mobile supports, the bioreactor being configured to obtain an effluent with a COD concentration of organic matter of less than 50 mg $l^{-1}$ and a total nitrogen concentration of less than 15 mg $l^{-1}$; providing a biofiltration tank, separate from the first buffer tank of the bioreactor, comprising one or more biologically activated carbon (BAC) columns containing activated carbon; supplying the first buffer tank upstream of the bioreactor with raw wastewater comprising micropollutants of pharmaceutical origin; pretreating the wastewater comprising micropollutants of pharmaceutical origin by passing the wastewater comprising micropollutants of pharmaceutical origin through a fine mesh sieve so as to retain particles having a diameter greater than 1 mm to provide sifted wastewater; in a first treatment, introducing the sifted wastewater into the populated bioreactor during a first retention time; introducing a second microbial consortium in the biofiltration tank; in a second treatment, introducing the wastewater treated by the bioreactor into the biofiltration tank to allow residues of micropollutants of pharmaceutical origin to be adsorbed onto the activated carbon; allowing the activated carbon, which has previously adsorbed the residues of micropollutants of pharmaceutical origin, to be colonized by the second microbial consortium in a form of biofilms so as to biodegrade the residues by the second microbial consortium and allowing the activated carbon to bioregenerate, during a second retention time, so as to provide treated wastewater; discharging the treated wastewater into an environment, wherein a total hydraulic retention time comprising a sum of the first retention time and the second retention time is determined so to obtain an average purification efficiency (R) of the micropollutants of pharmaceutical origin of the first group in the treated wastewater greater than 80% and an average purification efficiency of micropollutants of pharmaceutical origin of the second group greater than 40-50%, with reference to the micropollutants' content ($C_o$) in the raw wastewater, and wherein the method further comprises: providing a second buffer tank inserted between the moving bed membrane bioreactor (MB-MBR) and the biofiltration tank; in normal operation, supplying the second buffer tank with effluent from the first treatment and supplying the second treatment from the second buffer tank; and performing separate backwashing of membranes of the bioreactor and of the biologically activated carbon, without communication through the second buffer tank.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
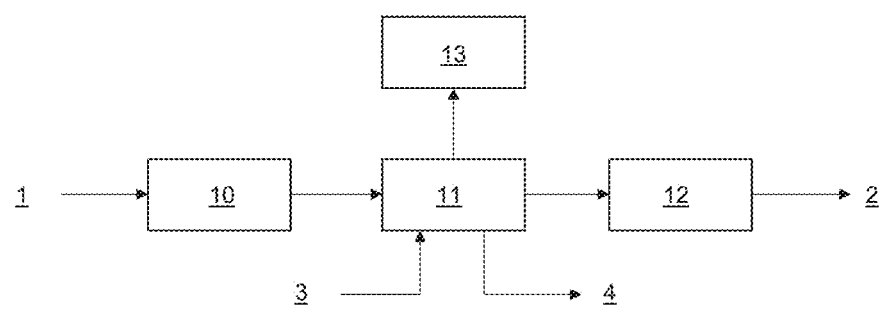
FIG. 1 schematically illustrates the processing sequences for a treatment plant having an MB-MBR/BAC coupling.

In an embodiment, the present invention provides a solution to the problem of the presence of micropollutants of pharmaceutical origin in wastewater.

In an embodiment, the present invention keeps the operational costs of purification under control, in particular those related to the electrical consumption of the plants.

In an embodiment, the present invention provides improvements over the prior art such as 100% biological treatment, the absence of clogging associated with the use of reverse osmosis membranes or even the absence of consumption (losses) of granular activated carbon (GAC) with the possibility of reactivation without expensive recycling.

In an embodiment, the present invention provides better control and optimizes the industrial use of BAC columns.

In an embodiment, the present invention uses bacterial supports which do not damage the membranes of the reactors.

In an embodiment, the present invention provides a purification plant which is compact and which has an acceptable visual appearance.

A first aspect of the present invention relates to a completely biological method for removing a first group of micropollutants of pharmaceutical origin and a second group of micropollutants of pharmaceutical origin from wastewater, the method comprising the steps of:
  providing a first buffer tank upstream of the bioreactor;
  providing a moving bed membrane bioreactor (MB-MBR) for developing biomass growth both on a fixed support and in suspension in the form of flocs, and on mobile supports, said bioreactor being configured to obtain an effluent with a COD concentration of organic matter of less than 50 mg $l^{-1}$ and a total nitrogen concentration of less than 15 mg $l^{-1}$;
  providing a biofiltration tank, separate from the bioreactor tank, comprising one or more biologically activated carbon (BAC) columns containing activated carbon;
  supplying the first buffer tank upstream of the bioreactor with wastewater comprising micropollutants of pharmaceutical origin;
  pretreating said wastewater comprising micropollutants of pharmaceutical origin by passing it through a fine mesh sieve, so as to retain particles having a diameter greater than 1 mm;
  in a first treatment, introducing the wastewater, once sifted, into the populated bioreactor possibly seeded with a first microbial consortium located and/or developing on the fixed parts and in suspension in the form of flocs, and on the mobile supports, during a first retention time;
  introducing or inoculating a second microbial consortium in the biofiltration tank;
  in a second treatment, introducing the wastewater treated by the bioreactor into the biofiltration tank and allowing the residues of micropollutants of pharmaceutical origin to be adsorbed onto the activated carbon;
  allowing the activated carbon having previously adsorbed the residues of micropollutants of pharmaceutical origin to be colonized by the second microbial consortium in the form of biofilms, allowing said residues to be biodegraded by the second microbial consortium and allowing the activated carbon to bioregenerate, during a second retention time;
  discharging treated wastewater into the environment;
  the total hydraulic retention time, consisting of the sum of the first retention time and the second retention time, being determined to obtain an average purification efficiency (R) of the micropollutants of pharmaceutical origin of the first group in the treated wastewater greater than 80%, preferably greater than 95%, and an average purification efficiency of micropollutants of pharmaceutical origin of the second group greater than 40-50%, with reference to their content ($C_o$) in the raw wastewater.

According to preferred modalities of the invention, the method comprises at least one of the following features, or an appropriate combination thereof:
  It comprises the following additional steps: in normal operation, providing a second buffer tank inserted between the moving bed membrane bioreactor (MB-MBR) and the biofiltration tank; supplying the second buffer tank (12) with the effluent from the first treatment and supplying the second treatment from the second buffer tank;
  performing separate backwashing of the membranes of the bioreactor (11) and of the biologically activated carbon;
  the tank of the hybrid moving bed membrane bioreactor (MB-MBR) is separated from the biofiltration tank by an ultrafiltration membrane, so as to separate the first and second microbial consortia, in particular to develop, without contamination, specialized bacteria on the activated carbon;
  the hydraulic contact time or EBCT in a biologically activated carbon (BAC) column is greater than 10 minutes;
  the hydraulic contact time is preferably between 10 and 20 minutes, and more preferably greater than 20 minutes, with a filtration rate HLR between 2 and at least 5 $mh^{-1}$;
  the micropollutants of pharmaceutical origin of the first group considered in the method comprise at least one micropollutant selected from the group consisting of amisulpride, carbamazepine, hydrochlorothiazide and metoprolol;
  the micropollutants of pharmaceutical origin of the second group considered in the method comprise at least one micropollutant selected from the group consisting of clarithromycin, cyclophosphamide and diclofenac;
  the membrane bioreactor is seeded by a first consortium of external microorganisms, so as to colonize fixed parts and the mobile supports with said microorganisms and to grow a biofilm on these fixed parts and these mobile supports to immobilize said microorganisms;

the microorganisms of the second consortium come from the effluent of the bioreactor and/or are at least in part different from those of the first consortium, following self-selection over time;

biologically activated carbon is used in the form of activated carbon in powder, grains or micrograins;

an additional step of purifying the air coming from the wastewater treatment system is implemented, in particular with a view to eliminating odors; by means of ozone, ultraviolet radiation or activated carbon.

A second aspect of the invention relates to a plant for implementing the method described above, characterized in that it comprises:

a first buffer tank for a stable supply of wastewater containing micropollutants of pharmaceutical origin;

a pumping unit;

a pretreatment step including at least one fine mesh sieve for the retention of particles having a diameter greater than 1 mm;

a hybrid moving bed membrane bioreactor (MB-MBR) for developing biomass growth both on a fixed support and in suspension in the form of flocs, and on mobile supports;

at least one biofiltration tank on biologically activated carbon distinct from the tank of the bioreactor, separated from the latter by an ultrafiltration membrane and located downstream of the latter, comprising one or more columns with biologically activated carbon (BAC);

a buffer tank inserted between the membrane bioreactor and the biofiltration tank, for the separate backwashing of the membranes of the MB-MBR bioreactor and of the biologically activated carbon;

storage and dosing units for chemicals;

an air and odor treatment system.

The studies by Nguyen et al. (2012, 2013) showed good performances of MBR purification for hydrophobic contaminants, as well as a certain capacity for degradation of hydrophilic and persistent micropollutants (carbamazepine, diclofenac and fenoprop) on granular activated carbon, justifying the complementarity of the two units. However, they also highlight a problem of degradation of the adsorption capacity over time of the activated carbon for some hydrophilic PPs, which raises questions about the method of activated carbon regeneration.

The inventors propose to solve this problem by the use of biologically activated carbon, because the regeneration of the activated carbon may be advantageously stimulated by the bacteria that are present.

When treating micropollutants, the development of new hybrid configurations of MB-MBR/BAC specifically designed to guarantee increased removal of pharmaceutical products (PPs) constitutes both a scientific and an environmental issue.

The success of this technology is based on (1) perfect control of the biotic (biosorption) or abiotic (volatization, adsorption on a support) transfers of micropollutants within the treatment unit, (2) the development of specific microbial purifying consortia, (3) an increase in the bioavailability of PPs and therefore of their biodegradation, (4) a decrease in membrane clogging and (5) a reduction in the environmental impact and energy costs.

The scientific approach associated with the project can be summarized as follows:

liquid hospital effluents have an effect on aquatic life;

but the installation of a treatment plant within the hospital center is currently too expensive;

conventional biological treatments are not suitable for removing pharmaceuticals, although biological treatment is the most effective step;

some advanced treatments are adequate (UV, $O_3$, AC); however, current advanced treatments are energy intensive;

the EU has included several pharmaceutical products in a list of priority substances; this list will be extended;

this project essentially investigates the limits of biological treatment by conceptually splitting the method into two steps allowing the development and optimization of different specialized microbial consortia (flocs, biofilm, BAC).

The processing line for the MB-MBR/BAC coupling according to a preferred embodiment of the invention and shown schematically in FIG. 1 comprises:

a buffer tank 10 in which the waste water 1 laden with PPs arrives;

a pumping unit;

a pretreatment step including at least one fine mesh sieve;

an MB-MBR reactor 11 (Moving Bed Membrane Bio Reactor) fed by wastewater coming from tank 10 and by air 3 and with the sludge discharge 4 and an air treatment unit at the outlet 13;

at least one biofiltration tank 12 separate from the MB-MBR reactor 11;

several storage and dosing units for chemicals;

an odor elimination system 13;

a storage tank for the products of the purges of the tank 11 the discharge of treated water 2 to the environment.

The buffer tank 10 ensures a stable supply of the biological treatment method. The fine sieving allows the removal of particles of size greater than 1 mm with a view, in particular, to avoiding sedimentation in the biological tanks (and therefore clogging of pipes, pumps, etc.). The two biological treatment tanks, preferably separated by an ultrafiltration membrane to avoid reciprocal contamination, allow the development of different microbial consortia. The first treatment tank 11 (MB-MBR) uses both suspended and fixed biomass growth methods to increase the biomass concentration and the efficiency of COD and N removal. The biofiltration (or biologically activated carbon) columns 12 are intended for the removal of pharmaceutical products remaining after passing through the MB-MBR tank 11 thanks to the bacteria of the second consortium in biofilms. The drug residues are adsorbed on the activated carbon; then the bacterial colonies develop on the proximal sites. According to the invention, a self-selection of bacteria specialized in the BAC is possible thanks to (1) the reduction of the easily biodegradable COD in the MB-MBR, which deprives the bacteria of nutrients and forces them to colonize the BAC, and (2) an ultrafiltration membrane separating the bacterial consortia of the two tanks.

According to an alternative embodiment, the two biological treatment tanks are not separated by an ultrafiltration membrane so that, during backwashing of the activated carbon, washing water laden with bacteria from the second consortium (specialized in BAC) may be returned to the MB-MBR to enrich the first bacterial consortium.

An odor elimination system is advantageously determined or optimized by considering:
- environmental and public health problems;
- requirements due to a high degree of compactness of the plant.

Study, Design and Validation of a Biological Treatment System

Three sampling campaigns were carried out on wastewater discharged by a hospital, in order to optimize, on the one hand, the MB-MBR mixed culture membrane bioreactor system and, on the other hand, to validate the purification mechanism of biologically activated carbon BAC columns.

Hospital effluents have been characterized. The proportion of micropollutants compared to the COD is quite minimal. The concentration of pharmaceutical residues is of the order of a few micrograms per liter (μg/l) while the COD contains at least several hundred milligrams per liter (mg/l).

Figure 2:
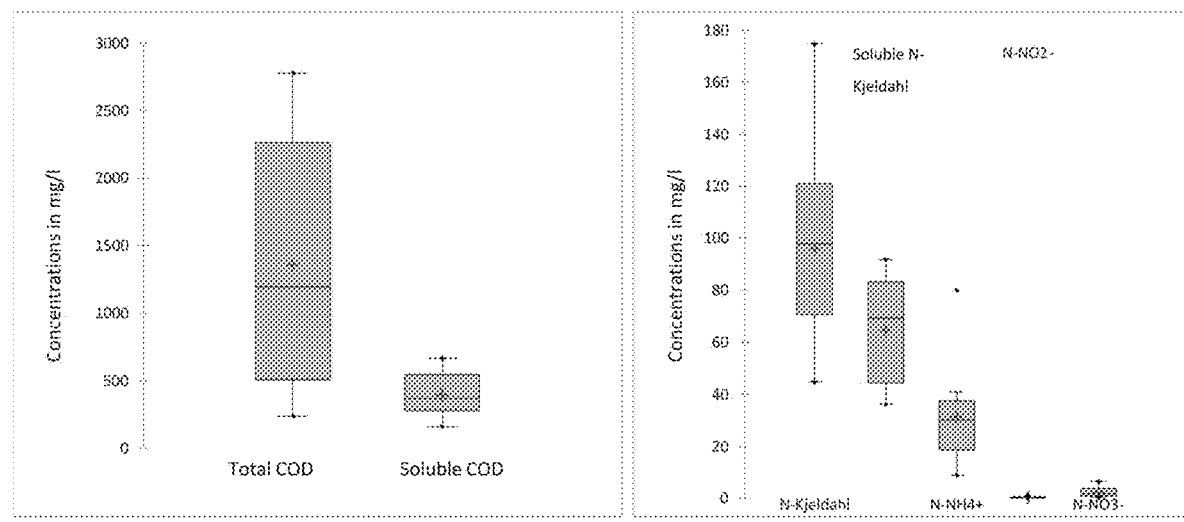
FIG. 2 gives typical values for a number of usual parameters in wastewater analysis (COD, temperature, conductivity, pH, etc.) as well as the concentrations of different types of detergent, organic macropollutants extractable by solvent, etc.) in an example of wastewater discharged by a hospital.
Figure 2:
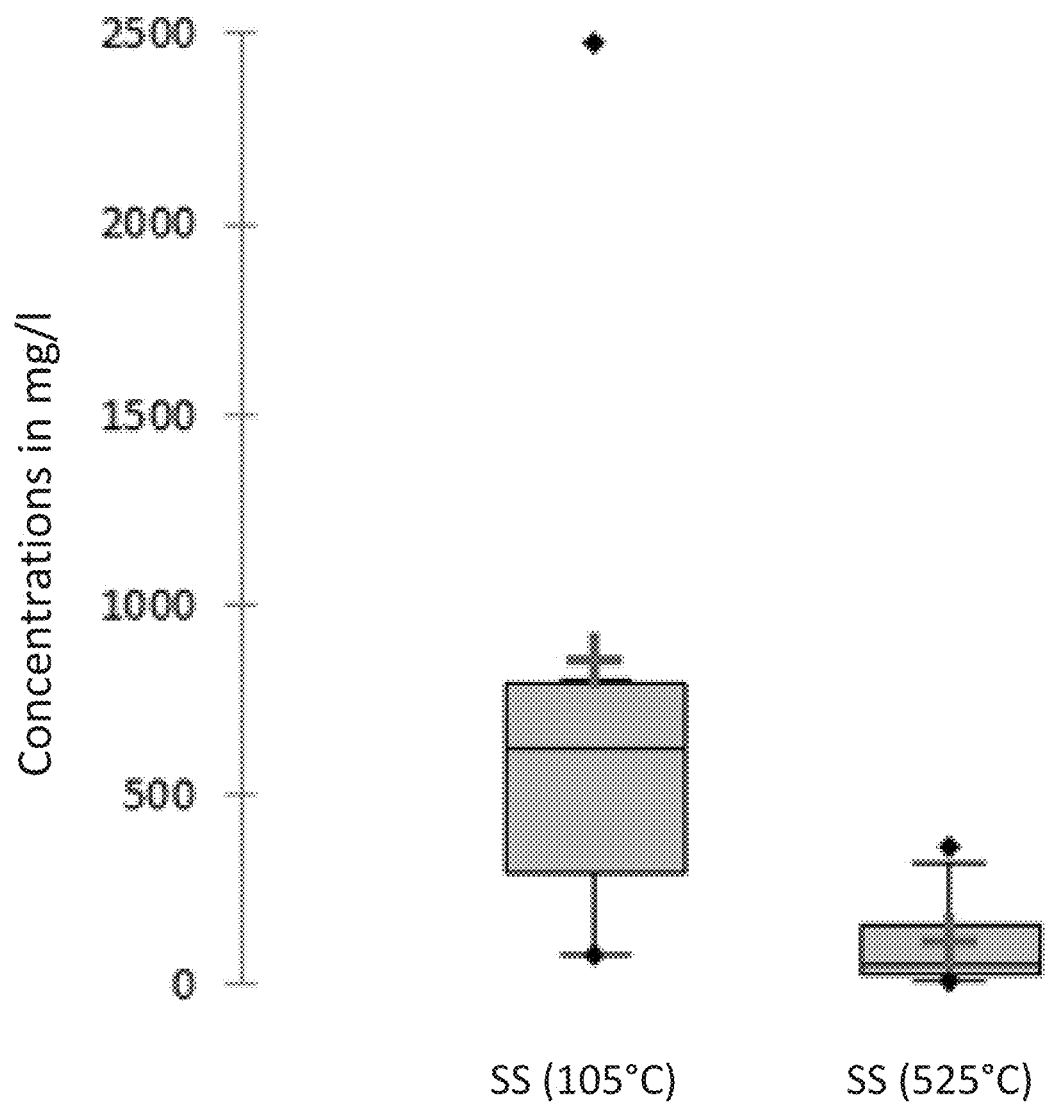
Figure 2:
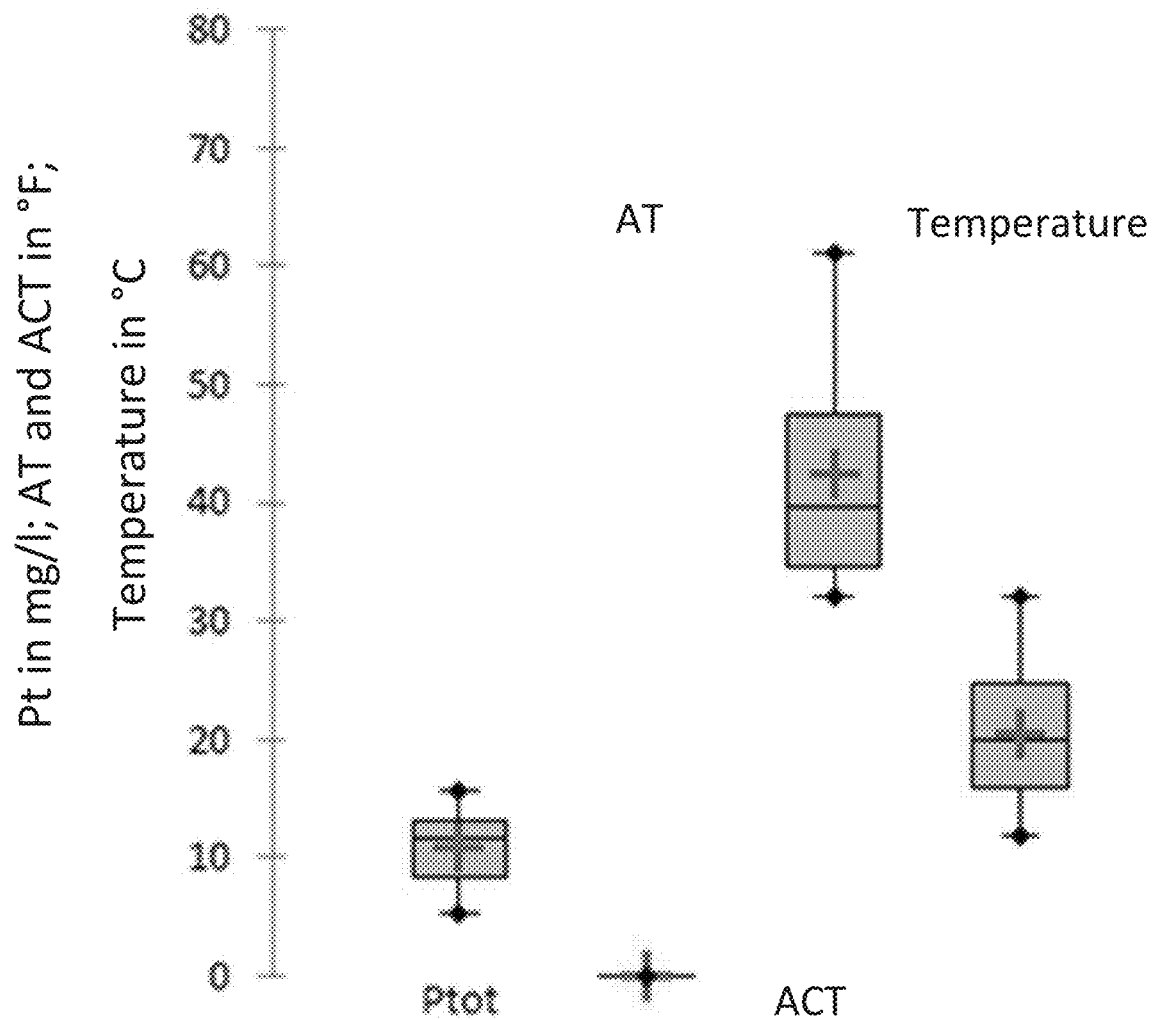
Figure 2:
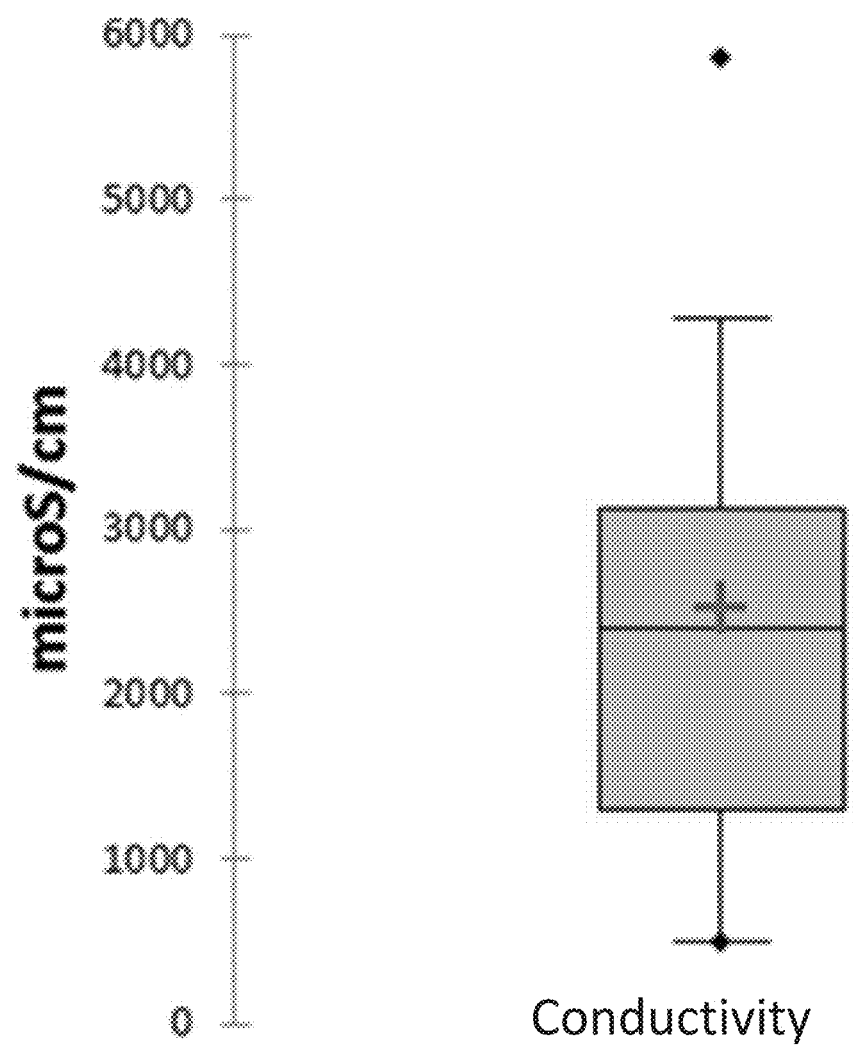
Figure 2:
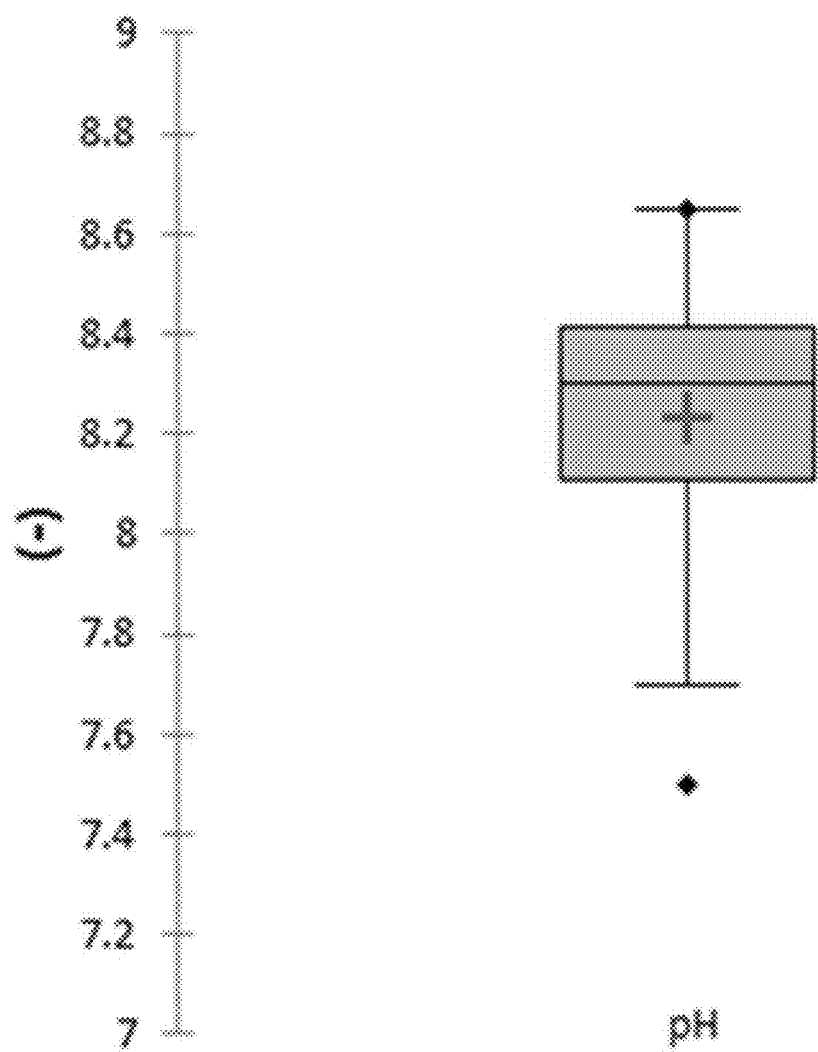
Figure 2:
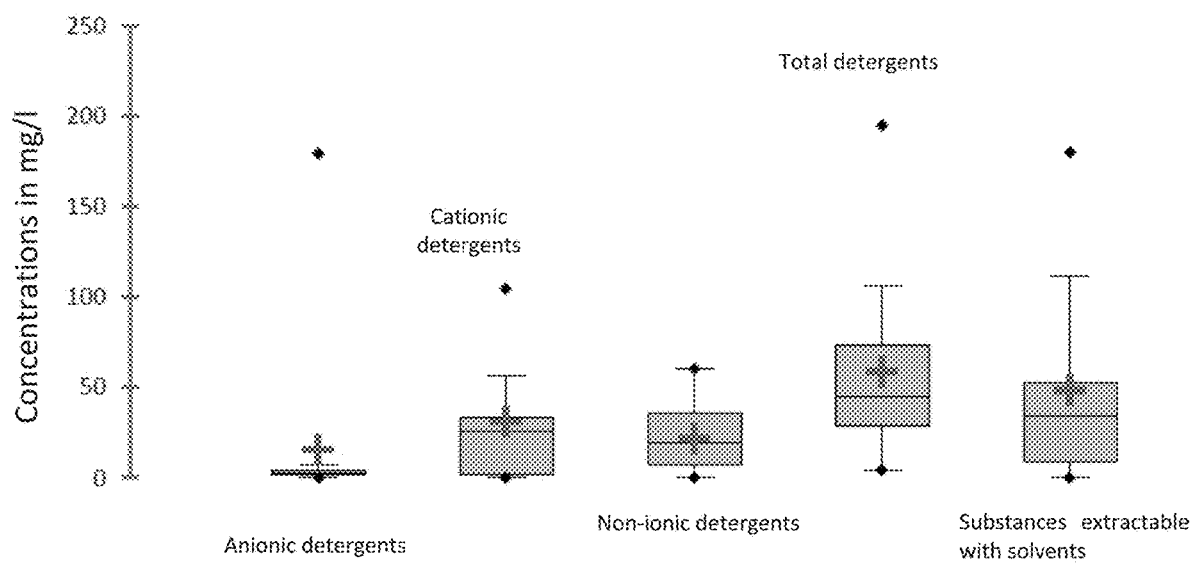

For example, FIG. 2 shows, among other parameters (COD, temperature, conductivity, pH, etc.) the concentrations of the different types of macropollutants (detergents) in the wastewater discharged by the hospital.

Each result corresponds to an analysis of 10 and 17 samples. The boxplots are delimited by the 25th and 75th percentiles, the diamonds correspond to the extreme values, the cross is the mean, while the median is represented by the horizontal line crossing the boxplot.

The experimental pilot unit was sized to treat the equivalent of discharge corresponding to one hospital bed, i.e. between 300 and 500 liters per day. The operational parameters were optimized to increase the micropollutant removal efficiencies and meet the water quality requirements in terms of macropollutant removal. By way of example, Table 2 shows the quality objectives to be achieved for wastewater treatment plants with capacities between 10 000 and 100 000 PE.

TABLE 2

Wastewater quality standard (in accordance with Directive 91/271/CEE)

| Parameters | Unit(s) | Target values |
|---|---|---|
| COD | mg $O_2$ $l^{-1}$ | ≤125 |
| Nt | mg N $l^{-1}$ | ≤15 |
| SS | mg $l^{-1}$ | ≤35 |

During the testing period, the micropollutant removal efficiencies were evaluated for various operational conditions (pO2, SRT and HRT), which may stimulate the installation of specific metabolic niches. By acting on these key parameters, special attention was paid to the installation of nitrifying and denitrifying metabolisms in the MB-MBR compartment. Indeed, a biology of this type (called nitrifying or low mass load) is also more efficient in terms of degradation of micropollutants.

The operating conditions of the MB-MBR unit and the associated macro- and micropollutant removal performance are given below. The efficiencies are expressed as a decimal number and are calculated from the concentration before treatment (C0) and after treatment (C). An efficiency of 1 equals 100% removal and of 0 equals 0% removal.

The first phase was devoted to the optimization of the nitrification and the second phase to the improvement of the denitrification process.

Two denitrification mechanisms were investigated: (1) simultaneous nitrification and denitrification (SNDN) and (2) alternation of aerobic and anoxic phases (ANDN). The potential for simultaneous active nitrification and denitrification (SNDN) is based on the presence of a biofilm immobilized on the supports. In a single reactor, the aim is to maintain operating conditions which allow heterotrophic bacteria to denitrify in anoxic areas of the biofilm, while nitrification takes place at the periphery of the biomass in aerobic areas. The theoretical advantage of the SNDN strategy is to save the anoxic volume. The SNDN mechanism may be explained by the limited oxygen transfer within the biofilm (existence of aerobic and anoxic areas).

The various operating parameters under test of the MB-MBR unit are listed in Table 3.

TABLE 3

Operational parameters of the pilot unit

| Parameters | Unit(s) | Min | Mean | Max | Stand. Dev. |
|---|---|---|---|---|---|
| MB | | | | | |
| OPERATIONAL | | | | | |
| HRT (MB) | Hours | 8.8 | 15 | 28.2 | 2.5 |
| SRT | Day $^{-1}$ | 17 | 35 | 50 | 16 |
| Temperature | ° C. | 15 | 19 | 25 | 3.1 |
| pH | — | 7.2 | 8 | 8.7 | 0.4 |
| BIOLOGY | | | | | |
| $[SS]_{LM}$ | kg $m^{-3}$ | 1.3 | 4.8 | 13.3 | 1.9 |
| $VSS_{LM}$ | % | 55 | 74 | 85 | 8 |
| $[SS]_{biofilm}$ | kg $m^{-3}$ | 0.1 | 0.5 | 1 | 0.3 |
| Bacterial supports | % total volume | — | 30 | — | — |
| LOADS | | | | | |
| Cv | kg COD $m^{-3}$ $d^{-1}$ | 0.2 | 0.7 | 2.0 | 0.3 |
| Cm | kg COD kg $VSS^{-1}$ $d^{-1}$ | 0.07 | 0.2 | 0.3 | 0.07 |
| SNDN | | | | | |
| $O_2$ Concentration | mg $O_2$ $l^{-1}$ | 1 | 1.6 | 2.4 | 0.7 |
| ANDN | | | | | |
| $O_2$ Concentration | mg $O_2$ $l^{-1}$ | 0.4 | 0.6 | 1.0 | 0.2 |
| Anoxia time | min | 6.0 | 9.6 | 12.0 | 2.6 |
| Aerobic time | min | 4.0 | 5.6 | 9.0 | 2.3 |
| Anoxia time | % | 31 | 46 | 57 | 11 |
| MBR | | | | | |
| Q surfac. (MBR) | 1 $m^{-2}$ $h^{-1}$ | 4 | 9 | 13 | 4.2 |
| Production time | min | — | 12 | — | — |
| Backwashing time | min | — | 1 | — | — |

Efficiency on Macropollutants

Figure 3:
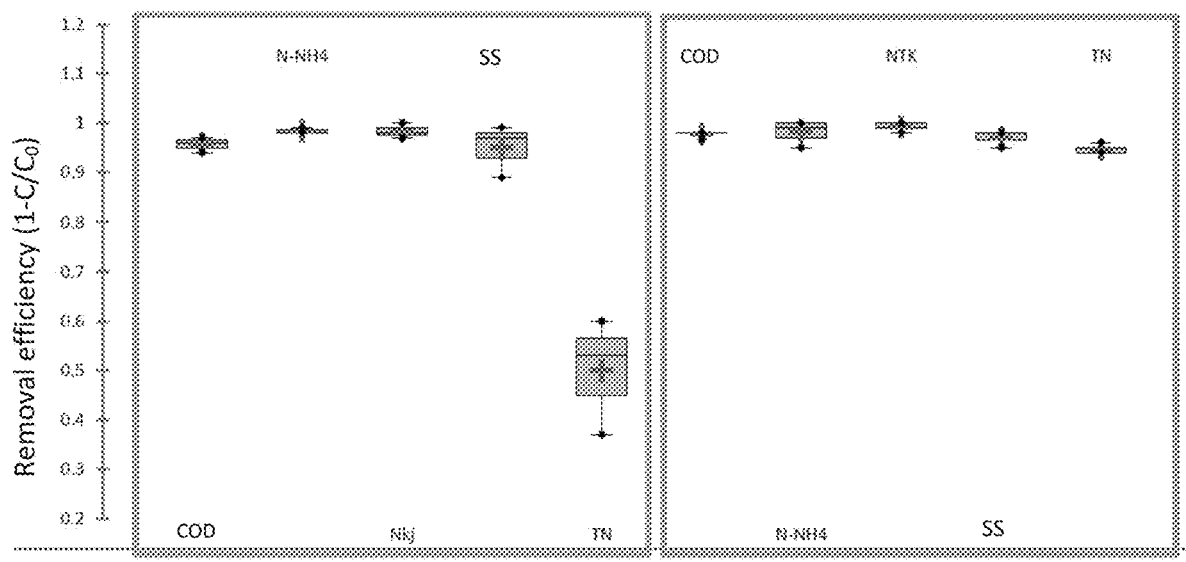
FIG. 3 shows the macropollutant removal efficiencies for the two aeration strategies investigated (denitrification by SNDN on the left, n=3 and ANDN, n=5 on the right).

On average, the quality of the effluents leaving the MB-MBR is very good. The concentrations of COD and suspended solids (SS) are respectively on average between 25 and 3 mg $l^{-1}$ (94 and 97% of removal efficiency). Although the nitrification step is not limiting (on average N—$NH_4$<0.8 mg $l^{-1}$), the total nitrogen removal efficiencies (TN in the figure) remained low (<50%) when the pilot unit was operating in SNDN configuration. The thickness of the biofilm on the bacterial supports was probably not sufficient to allow an oxygen concentration gradient inducing anoxic conditions. By switching to phase alternation, good performance could be achieved with a total nitrogen concentration at the outlet of the MB-MBR of less than 15 mg $l^{-1}$. FIG. 3 summarizes the macropollutant removal efficiencies for the two aeration strategies investigated (denitrification by SNDN on the left, n=3 and ANDN n=5 on the right). The boxplots are delimited by the 25th and 75th percentiles, the diamonds correspond to the minimum and maximum performance observed, the cross is the mean, and the median is represented by the horizontal line crossing the boxplot.

Efficiency on Micropollutants

Figure 4:
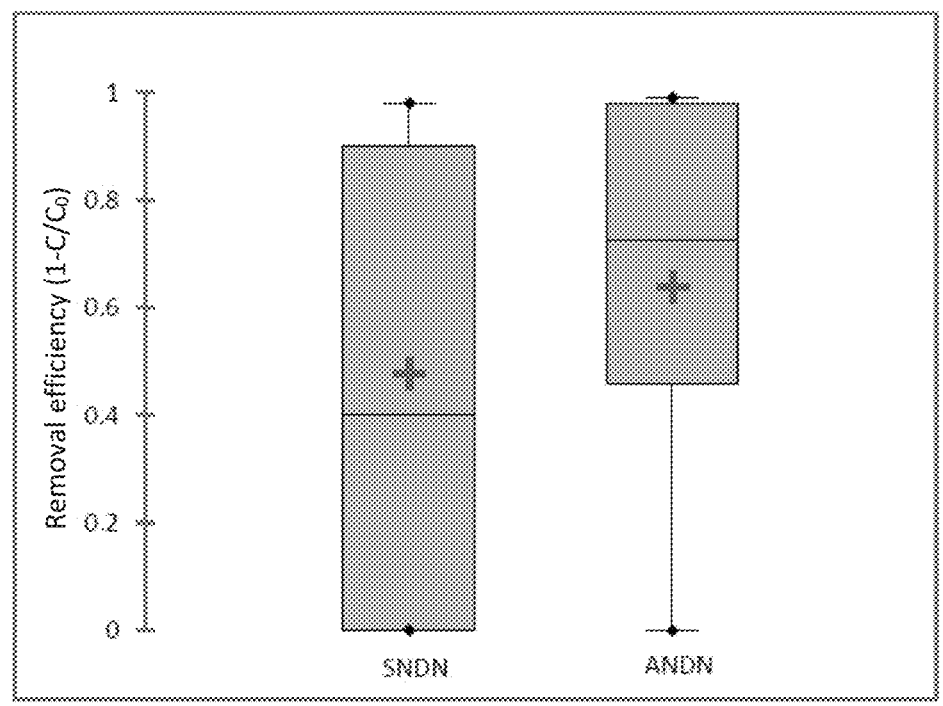
FIG. 4 shows the corresponding removal efficiencies in the case of micropollutants.

The corresponding efficiencies for all the micropollutants are shown in FIG. 4 (same statistical conventions as for FIG. 3). The average removal efficiency of micropollutants under ANDN conditions (good removal of total nitrogen) reached 64% against 48% in SNDN. Note that the ANDN strategy shows much more stable efficiencies (lower inter-quantile deviation, variance and standard deviation).

Figure 5:
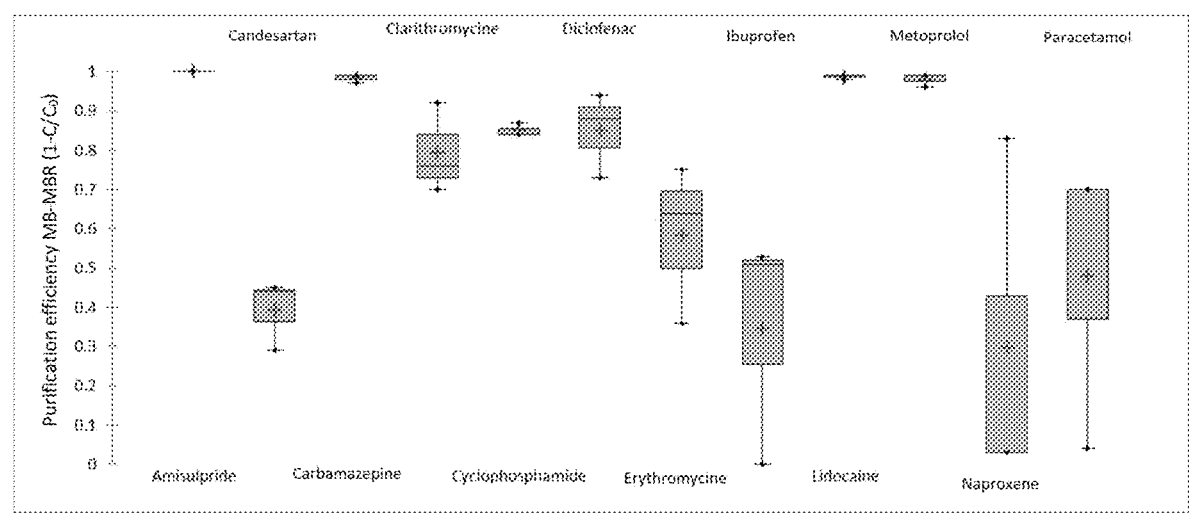
FIG. 5 shows the purification yield of the MB-MBR part of the method according to the invention for all the quantifiable indicator molecules.

The analysis of the purification efficiencies for the indicator molecules is presented with the exception of three molecules (carbamazepine, diclofenac, lidocaine) which could not be assayed using the unique protocol developed by the analysis center. FIG. 5 shows the purification efficiency of the MB-MBR part of the method according to the invention for each of the quantifiable indicator molecules. The boxplots are delimited by the 25th and 75th percentiles, the diamonds correspond to the minimum and maximum efficiency observed, the cross is the mean and the median is represented by the horizontal line crossing the boxplot.

Microbiology

A series of metagenomic analyzes were carried out throughout the project to determine the evolution of bacterial diversity in the biofilm and the mixed liquor. Spot samples of the mixed liquor and biofilm were taken at the end of each key phase of the experimental program.

The diversity analysis makes it possible to deduce the following information:
1. The number of species decreases over time in both "biofilm" and "mixed liquor" samples. During the first experimental phase (SNDN), a greater diversity is observed in the bacterial communities of the biofilm and the mixed liquor. The change in aeration strategy (passage from SNDN to ANDN from the "day 177" sample causes the bacterial diversity to drop by approximately 30%.
2. The structure of bacterial communities evolves towards a limited number of species for both types of biomass.
3. Bacterial diversity is significantly influenced by the "time" variable, but not by the "biomass type" variable. Indeed, the bacterial diversity between the biofilm and the mixed liquor is close.

For example, the following bacterial genera are specialized for the colonization of BAC, and are not detected in the MB-MBR compartment: *Acidovorax, Alcaligenes, Gemmatimonas, Leuconostoc, Luteimonas, Methylophilus, Methylovorus, Myroides, Ornithinimicrobium, Paludibacter, Phenylobacterium, Polaromonas, Propogenium, Pseudoxanthomonas, Saccharibacter, Staphylococcus, Rhodobium, Saccharibacter, Terrimonas*, and *Xanthobacter.*

More specifically, the following bacterial genera seem to promote the regeneration of BAC: *Acidovorax, Gemmatimonas, Luteimonas, Paludibacter, Phenylobacterium, Propogenium* and *Terrimonas.*

According to the invention, these bacteria may be advantageously considered as being able to form part of the second microbial consortium in the BAC biofiltration tank.

Optimal BAC Operating Parameters

The activated carbon used was in GAC form, for example of the Norit 830W type (Cabot). According to the invention, however, several types of activated carbon may be used, by varying the nature of the carbon, the specific surface developed and the type of pores.

According to one embodiment, the GAC was conditioned for 2 months with the wastewater effluents coming from the MB-MBR before being placed in an acrylic glass column. Operation was monitored for approximately 5 months. The purpose of conditioning is to reduce the time before the breakthrough point of the filter, i.e. the moment when the adsorption capacity is exhausted and biodegradation is the dominant process.

The biological purification performance of micropollutants was evaluated according to the following methodology:
1. Saturation of adsorption sites and verification by measuring the reduction in dissolved organic carbon;
2. Evaluation of bacterial activity via measurements of oxygen consumption;
3. Correlation analyzes between bacterial activity and micropollutant removal.

The shape of the carbon pollution removal curve (Dissolved Organic Carbon or DOC) as a function of the volume treated, expressed in number of bed volume (Bed volume (Nr), BV), is divided into three parts:
a. A type 1 removal phase,
b. A phase in which removal is stopped ("plateau" phase),
c. A type II removal phase.

Figure 6:
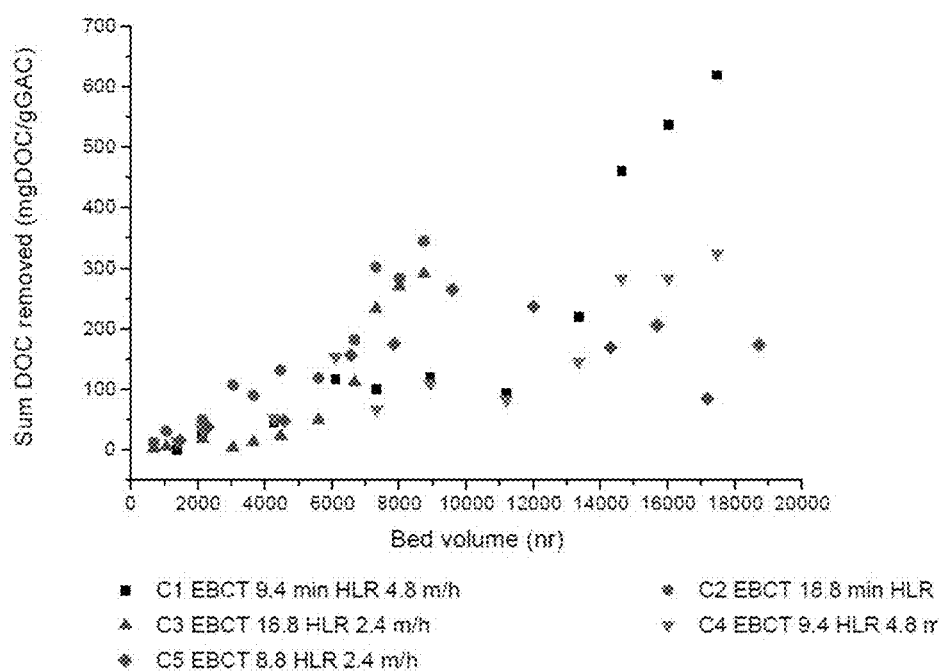
FIG. 6 shows the shape of the cumulative consumption curve of dissolved oxygen (DO) on the five columns of AC according to a preferred embodiment of the invention.

The profile of the DOC removal curve shows, in FIG. 6, two distinct removal kinetics, the transition point appearing at 6,000 BV (column C2 and C3) and at 13,000 BV (column C1, C4 and C5). The type II removal phase shows much greater bacterial activity than the type I phase. The bioactivity phase II begins after 60 days.

Figure 7:
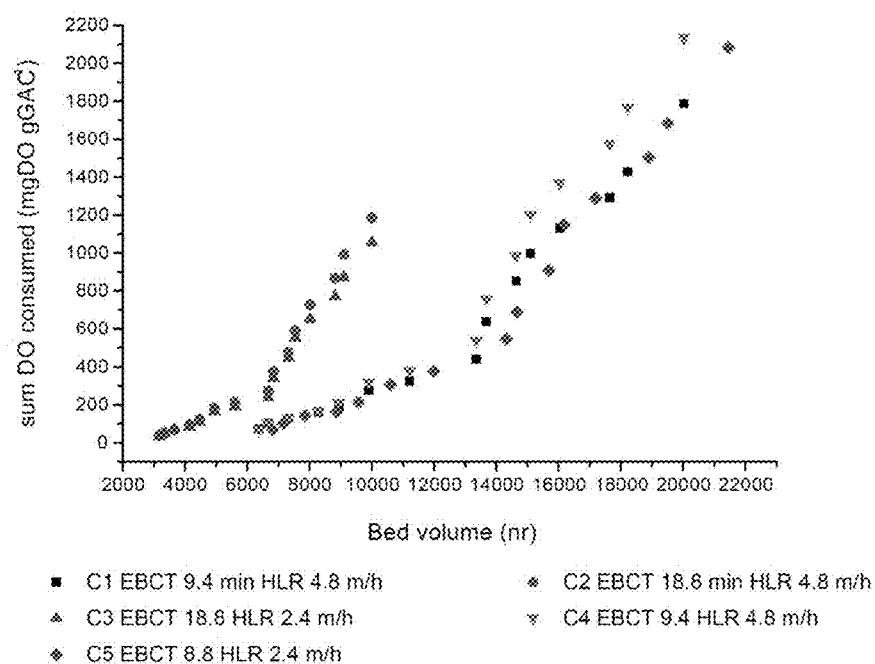
FIG. 7 shows the integration of the data presented in FIG. 6.

The analysis of the cumulative consumption of dissolved oxygen (DO) shown in FIG. 7 suggests the development of microbial activity (oxygen consumption) responsible for the removal of DOC observed after 6,000 BV and 13,000 BV for columns C2-C3 and columns C1-C4-C5, respectively.

To bring to light a biological activity of degradation of micropollutants, two molecules were monitored: clarithromycin, a moderately biodegradable molecule, and carbamazepine, a hardly biodegradable molecule.

The shape of the clarithromycin degradation curve follows the same pattern as that of the consumption of DOC (two removal phases separated by a "plateau" phase). This observation suggests that the development of bacterial activity improves the removal of this micropollutant.

The shape of the cumulative reduction curve of carbamazepine may serve as a ("blank") control of an activated carbon column without bioactivity. Two reduction regimes are clearly identifiable: junction at 6,000 BV (column C2 and C3) and 13,000 BV (column C1, C4 and C5). All precautions taken, it is reasonable to conclude that the microbial activity contributes significantly to the removal of micropollutants as suggested by the data presented in FIG. 7.

Figure 8:
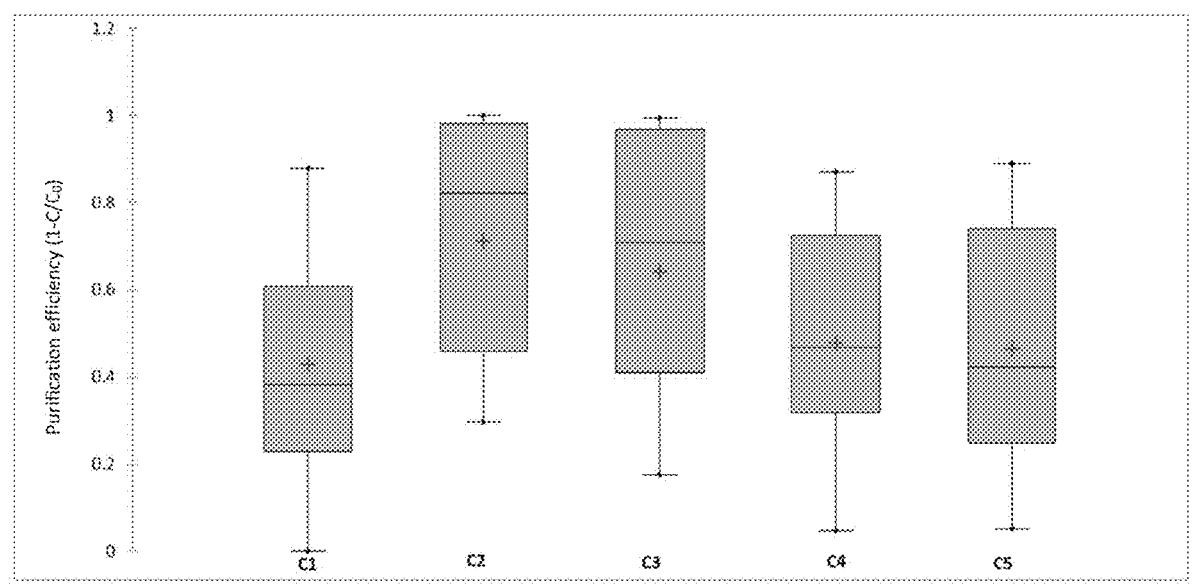
FIG. 8 shows the purification efficiencies of 12 of the 13 indicator molecules on the five columns of AC according to a preferred embodiment of the invention.

Based on the operational parameters selected for columns C1 to C5, the purification efficiencies of 12 of the 13 molecules indicative of the efficiency of the method are presented in FIG. 8. The results show the best performances for columns C2 and C3 with a slightly higher average efficiency for column C2 (0.71 against 0.64).

Column C2 achieves the best overall performance for a hydraulic contact time (Empty Bed Contact Time or EBCT) of 18.8 min and an HLR of 4.8 mh$^{-1}$.

A few easily biodegradable molecules such as paracetamol, naproxen or ibuprofen show average efficiencies of less than 50%. These low efficiencies are explained by an input concentration close to the LOQ.

Operational Constraint for the MB-MBR-BAC Coupling

Note the need to install a buffer tank between the two biological stages (MB-MBR and BAC). This hydraulic buffer is necessary for the backwashing of the membranes of the MBR and that of the carbon of the BAC columns. This structure will be sized on the basis of a hydraulic residence time of 1 to 3 hours depending on the configuration and the number of BAC columns selected.

Two-Stage Method—Purification Efficiencies

The purification efficiencies of the method according to the invention were evaluated in terms of removal of macro- and micropollutants on 6 average 24 hrs samples. The purification efficiency R (in percent) is defined as follows:

$$R = 100 \times \left(1 - \frac{C}{C_0}\right)$$

where $C_0$ and C are the input (influent) and output (effluent, permeate) concentrations of the respective pollutants, respectively.

Figure 9:
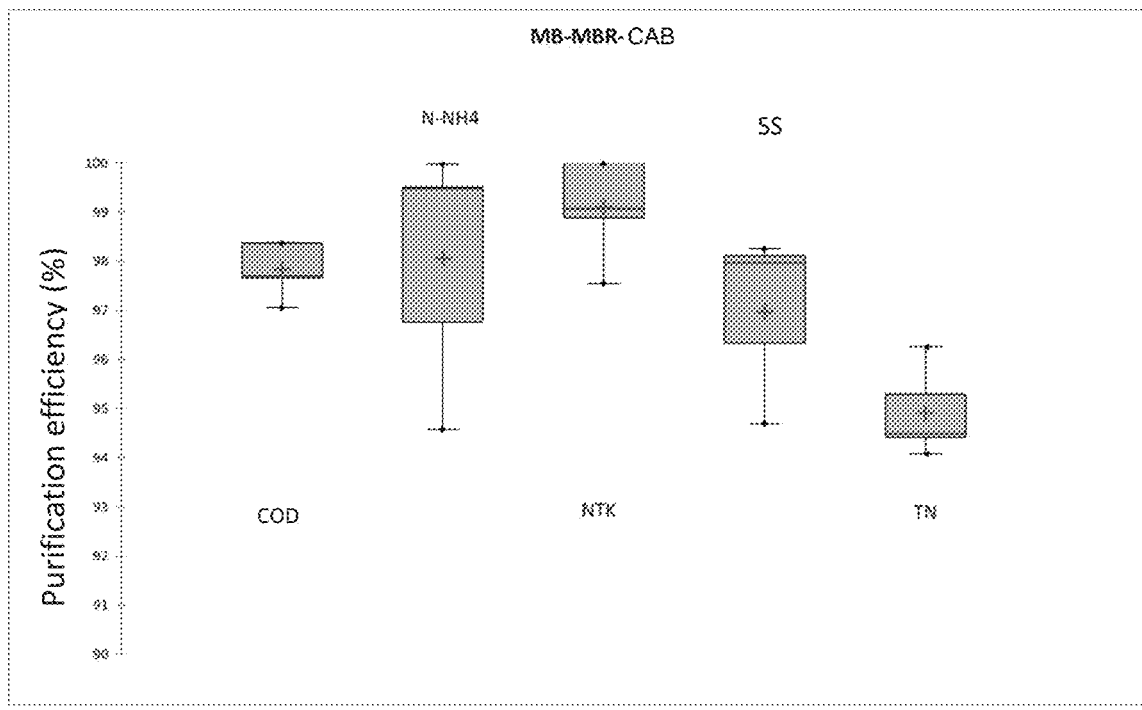
FIG. 9 shows the overall purification efficiency for the removal of macropollutants in MB-MBR-BAC.

The larger part of the removal of macropollutants takes place in the MB-MBR (BAC efficiency <1% of the overall efficiency for COD and nitrogen). The results are shown in FIG. 9.

Figure 10:
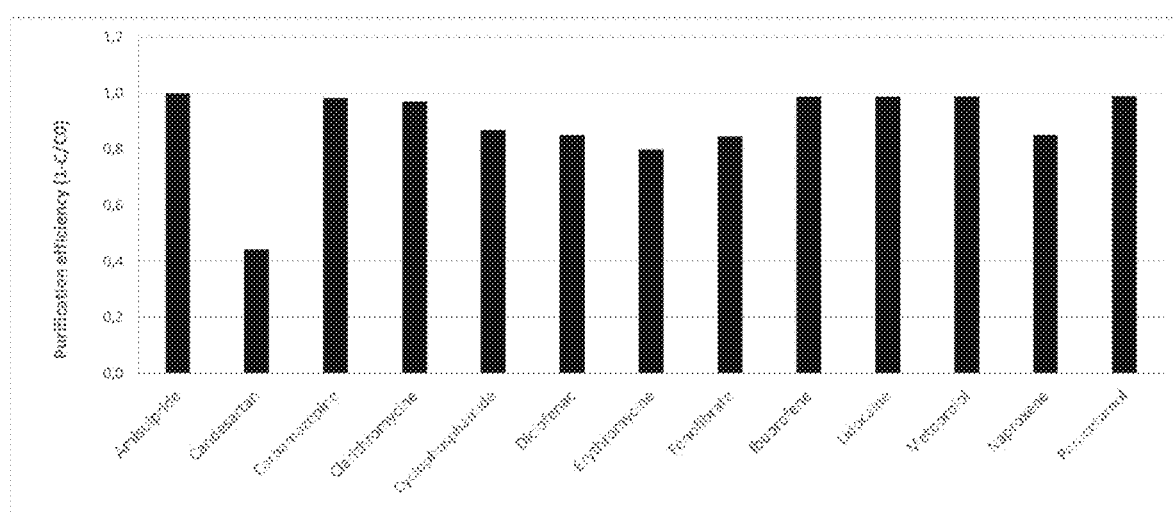
FIG. 10 gives the individual purification efficiencies of the overall method for 12 of the 13 indicator molecules.

Out of the thirteen indicator molecules, twelve show an overall purification efficiency greater than or equal to 80% (FIG. 10). Among these, clarithromycin, erythromycin and diclofenac are included in the European watch list (EU 2015/495).

Candesartan, an anti-hypertensive agent, is characterized by a removal efficiency slightly greater than 40%. Few references are found in the literature on its biological removal. Gurke et al. (2015) analyzed the loads of candesartan entering and leaving a biological wastewater treatment plant. The average removal efficiency of the ten samples analyzed is equal to 0% with a standard deviation of +/−10%. This shows the difficulty of removing this compound by biological treatments. For the rest of the molecules, the effectiveness of the method according to the invention is well confirmed.

In conclusion, the purification efficiencies, as defined above, were calculated for a pilot unit in stationary conditions, the operating parameters of which were optimized during the experimental phase. The average purification efficiency of several molecules is defined as the arithmetic mean of the respective purification efficiency. Out of the thirteen micropollutants selected as molecules indicating the proper functioning of the process, twelve show an average removal efficiency greater than or equal to 80%. Among these, clarithromycin, erythromycin and diclofenac are on the European watch list. Candesartan, an anti-hypertensive agent that is very difficult to biodegrade, is characterized by an average removal efficiency of 44%.

The summary of the results shows that the method developed within the framework of the invention is particularly effective for molecules which are difficult to biodegrade (candesartan, cyclophosphamide, diclofenac and metoprolol). The average efficiency of the thirteen molecules is 89% with a standard deviation of 15%.

A more detailed analysis on 16 molecules shows that two different groups of compounds may be described. The first group includes all the compounds that have been degraded by more than 80% on average (amisulpride, carbamazepine, hydrochlorothiazide and metoprolol) with little variation (dispersion, standard deviation). The second group includes compounds for which the average degradation is around 50% with a fairly high variation (e.g. clarithromycin, cyclophosphamide, diclofenac). This group is the most interesting because apparently some column conditions favor good degradation and others do not. It could be shown that clarithromycin, cyclophosphamide and diclofenac were better degraded with longer EBCTs (e.g. 19 minutes). In addition, higher HLR filtration rates (e.g. 4.8 m/h) make the columns more efficient than lower HLR (e.g. 2.4 m/h).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1 Wastewater
2 Treated water (discharge)
3 Air
4 Sludge
10 Pretreatment buffer
11 MB-MBR
12 Biofiltration
13 Air treatment

| Abbreviations list | | |
|---|---|---|
| Abbreviation | Meaning | Unit |
| AC | Activated carbon | |
| ACP | Activated carbon powder | |
| AOP | Advanced oxidation method | |
| BAC | Biologically activated carbon | (—) |
| BV | Bed volume | (—) |
| CAS | Conventional activated sludge | |
| COD | Chemical oxygen demand | mg $O_2$ $l^{-1}$ |
| DO | Dissolved oxygen | mg $O_2$ $l^{-1}$ |
| DOC | Dissolved Organic Carbon | mg C $l^{-1}$ |
| EBCT | Empty bed contact time | min |
| GAC | Granulated activated carbon | |
| HLR | Hydraulic loading rate | m $h^{-1}$ |
| HRT | Hydraulic retention time | h |
| LOQ | Limit of quantification | |
| MB-MBR | Moving Bed Membrane Bioreactor | (—) |
| Nr | Number | (—) |
| Nt (or TN) | Total nitrogen | |
| PE | Population equivalent | (—) |

| Abbreviations list | | |
|---|---|---|
| Abbreviation | Meaning | Unit |
| SRT | Solids retention time | |
| SS | Suspended substance | mg l$^{-1}$ |
| TKN | Total Kjeldahl Nitrogen | mg N l$^{-1}$ |
| VSS | Volatile substance in suspension | mg l$^{-1}$ |

The invention claimed is:

1. A completely biological method for removing a first group of micropollutants of pharmaceutical origin and a second group of micropollutants of pharmaceutical origin from raw wastewater, the method comprising: providing a first buffer tank; providing a moving bed membrane bioreactor (MB-MBR) for developing biomass growth both on a fixed support and in suspension in a form of flocs, and on mobile supports, the bioreactor being configured to obtain an effluent with a COD concentration of organic matter of less than 50 mg/l and a total nitrogen concentration of less than 15 mg/l; providing a biofiltration tank, separate from the bioreactor, comprising one or more biologically activated carbon (BAC) columns containing activated carbon; supplying the first buffer tank with raw wastewater comprising micropollutants of pharmaceutical origin, wherein the bioreactor is seeded with a first microbial consortium, wherein the first buffer tank is located upstream of the bioreactor; pretreating the wastewater comprising micropollutants of pharmaceutical origin by passing the wastewater comprising micropollutants of pharmaceutical origin through a fine mesh sieve so as to retain particles having a diameter greater than 1 mm to provide sifted wastewater; in a first treatment, introducing the sifted wastewater into the bioreactor during a first retention time; introducing a second microbial consortium in the biofiltration tank; in a second treatment, introducing the wastewater treated by the bioreactor into the biofiltration tank so that residues of micropollutants of pharmaceutical origin are adsorbed onto the activated carbon, so that the activated carbon, which has previously adsorbed the residues of micropollutants of pharmaceutical origin is colonized by the second microbial consortium in a form of biofilms so as to biodegrade the residues by the second microbial consortium and so that the activated carbon to bioregenerates, during a second retention time, so as to provide treated wastewater; discharging the treated wastewater into an environment, wherein a total hydraulic retention time comprising a sum of the first retention time and the second retention time is determined so to obtain a first purification efficiency (R) of the micropollutants of pharmaceutical origin of the first group in the treated wastewater greater than 80% and a second purification efficiency of micropollutants of pharmaceutical origin of the second group greater than 40-50%, with reference to the micropollutants' content (Co) in the raw wastewater; and wherein the method further comprises: providing a second buffer tank inserted between the moving bed membrane bioreactor (MB-MBR) and the biofiltration tank; in normal operation, supplying the second buffer tank with effluent from the first treatment and supplying the second treatment from the second buffer tank; and performing separate backwashing of membranes of the bioreactor and of the activated carbon, without communication through the second buffer tank.

2. The method according to claim 1, wherein the moving bed membrane bioreactor (MB-MBR) is separated from the biofiltration tank by an ultrafiltration membrane so as to separate the first and second microbial consortia.

3. The method according to claim 1, wherein a hydraulic contact time or empty bed contact time (EBCT) for each BAC column is greater than 10 minutes with a filtration rate HLR between 2 and 5 mh$^{-1}$.

4. The method according to claim 1, wherein the micropollutants of pharmaceutical origin of the first group comprise at least one of amisulpride, carbamazepine, hydrochlorothiazide, or metoprolol.

5. The method according to claim 1, wherein the micropollutants of pharmaceutical origin of the second group comprise at least one of clarithromycin, cyclophosphamide, or diclofenac.

6. The method according to claim 1, wherein the first microbial consortium colonizes the fixed support and the mobile supports with microorganisms and grows a biofilm thereon so as to immobilize the microorganisms.

7. The method according to claim 1, wherein microorganisms of the second microbial consortium come from an effluent of the bioreactor or are at least in part different from microorganisms of the first consortium, following self-selection over time.

8. The method according to claim 1, wherein the activated carbon comprises powdered, granular, or microgranular activated carbon.

9. The method according to claim 1, further comprising: purifying air so as to eliminate odors using ozone, ultraviolet radiation, or a second activated carbon.

10. The method according to claim 1, wherein the first microbial consortium is located on the fixed support and in suspension in a form of flocs, and on the mobile supports.

11. The method according to claim 1, wherein the first purification efficiency (R) of the micropollutants of pharmaceutical origin of the first group in the treated wastewater is greater than 95%.

12. The method according to claim 3, wherein the hydraulic contact time or empty bed contact time (EBCT) for each BAC column is between 10 and 20 minutes.

* * * * *